Oct. 9, 1951  F. T. HARRINGTON  2,570,342
PUMP CONTROL
Filed Nov. 26, 1945
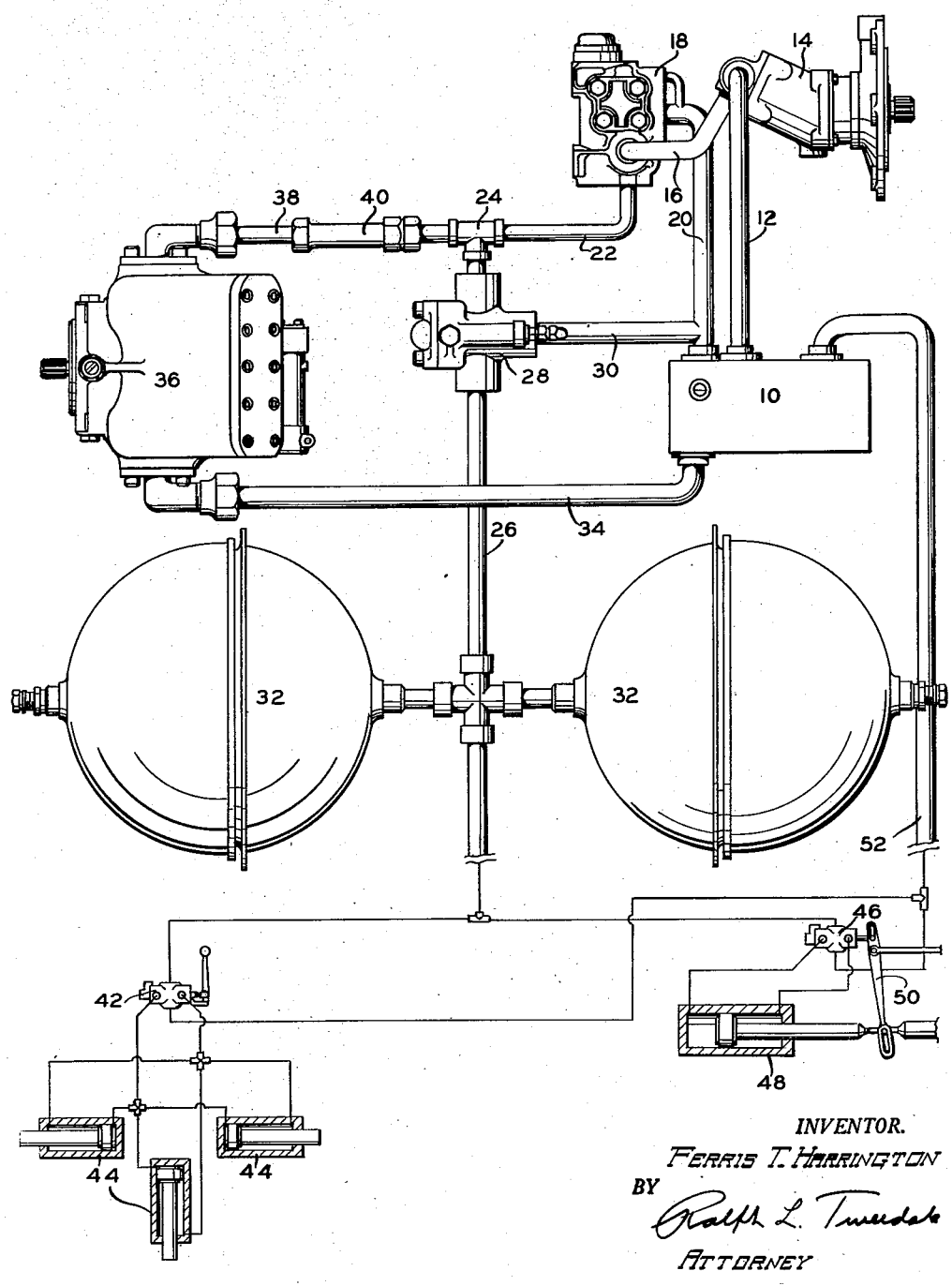
INVENTOR.
FERRIS T. HARRINGTON
BY
Ralph L. Tweedale
ATTORNEY Patented Oct. 9, 1951

2,570,342

UNITED STATES PATENT OFFICE 2,570,342

PUMP CONTROL

Ferris T. Harrington, Detroit, Mich., assignor to Vickers Incorporated, Detroit, Mich., a corporation of Michigan Application November 26, 1945, Serial No. 630,919

2 Claims. (Cl. 103—11)

This invention relates to power transmissions, particularly to those of the type comprising two or more fluid pressure energy translating devices, one of which may function as a pump and another as a fluid motor.

The invention is more particularly concerned with a power transmission system incorporating a plurality of pumps such, for example, as are found aboard aircraft. In some installations where a wide variety of hydraulically-operated devices are connected for operation from a central pressure system, the volumetric demands on that system fluctuate widely; for example, in a large aircraft the volumetric requirements for pressure fluid to operate such devices as landing gear retraction cylinders, wing flaps, bomb bay doors, etc., are quite large but are only required to be operated intermittently at long intervals. Other devices, such as flight-control boosters, automatic pilots, etc., require relatively small volumes but operate continuously for long periods.

Where the pressure source for such a system constitutes one or more fixed displacement pumps provided with the usual pressure-responsive unloading valve and accumulator, the pump and accumulator capacity must be sufficient to take care of the momentary large volume requirements, and these requirements, in fact, determine the design characteristics of the pressure source. Such a system, however, is not particularly well adapted to supply small volume requirements continuously inasmuch as the pressure differential of the unloading valve makes it impossible to provide fluid continuously at a uniform pressure. Also, the surges which result from the sudden opening or closing of the unloading valve of large capacity are sometimes undesirable when a small volume device is in operation, particularly a sensitive one such as an automatic pilot or control booster.

It is an object of the present invention, therefore, to provide an improved pressure source capable of meeting intermittent large-volume requirements and continuous small-volume requirements at steady pressure.

It is also an object to provide such a system wherein a large fixed-displacement pump, unloading valve and accumulator are provided for supplying intermittently those operating devices requiring large volume together with a small-volume, variable displacement, pressure-controlled pump capable of supplying small volumes at a steady pressure continuously.

It is a further object to provide a system of this character wherein the circuit connections are simple and reliable and wherein either pump may automatically supply the system in the event of failure of the other pump without the requirement of manual intervention.

Further objects and advantages of the present invention will be apparent from the following description, reference being had to the accompanying drawing wherein a preferred form of the present invention is clearly shown.

In the drawing the single figure is a diagrammatic view of a hydraulic power transmission system incorporating a preferred form of the present invention.

Referring now to the drawing, there is shown an oil reservoir 10 having a line 12 leading to a suction port of a large-volume, fixed displacement pump 14. The delivery port of the pump 14 connects by a conduit 16 with a pressure-responsive unloading valve 18 which has its return port connected to the reservoir 10 by a conduit 20. The system port of valve 18 leads by a conduit 22 to a T 24 connecting with the main supply line 26. The latter has an overload relief valve 28 connected therein having its overflow port connected to the reservoir by a conduit 30. T'd into the main pressure line 26 is a pair of air-loaded accumulators 32.

Also leading from the reservoir 10 is a suction conduit 34 leading to the inlet port of a small-volume, variable displacement pump 36. The pump 36 is of the type provided with a pressure-responsive, displacement regulator which, when the system pressure builds up to a predetermined value, begins to reduce the displacement of pump 36 and, upon a slight further rise, is capable of reducing the displacement substantially to zero. The delivery port of pump 36 connects by a conduit 38 having a check valve 40 therein to the T 24. The pumps 14 and 36 may be driven from any suitable prime mover on either a single-engine or a multi-engine ship, preferably from separate engines.

The unloading valve 18 may be of any conventional construction wherein, upon the system pressure building up to a predetermined point, the delivery of pump 14 is bypassed to the reservoir 10 through conduit 20, an internal check valve preventing backflow from the delivery conduit 22. Upon the drop of system pressure to a predetermined value below the cut-out point, the unloading valve will cut in by closing the bypass, causing the pump delivery to be directed to the system. The pressure settings of unloading valve 18 and pump 36 are arranged so that the cut-out point of unloading valve 18 is slightly below the point at which the pressure regulator of pump 36 begins to reduce the pump stroke.

There are shown on the drawing diagrammatically the elements of a typical hydraulic system including a four-way selector valve 42 for controlling a plurality of piston-and-cylinder fluid motors 44 connected in parallel and representing the type of load which is operated only intermittently at infrequent intervals and which, when operated, requires a substantially large volume of fluid. There is also shown a control booster comprising a servo valve 46 and booster cylinder 48 together with a floating lever, follow-up control 50 which is representative of the type of load requiring only a small volume, but requiring it continuously over long periods. A return line 52 leads from the exhaust ports of the valves 42 and 46 back to the reservoir 10.

In operation with the system filled with oil and pumps 14 and 36 operating when the four-way valve 42 is shifted to cause operation of the motor 44, the volumetric requirements are so great that oil is withdrawn from the pressure line 26 and accumulators 32 at a rate great enough to drop the pressure in the line 26 below the cut-in point of unloading valve 18 rather promptly after the valve 42 is shifted. Under these conditions pump 36 is at full displacement and pump 14 has its entire volume directed through line 22 to line 26 so that motors 44 are supplied with the full volume of both pumps plus whatever additional volume may be required from the accumulators 32.

When the motors 44 have reached the ends of their stroke, the full delivery of both pumps continues to be directed into line 26 and the accumulators 32 until the pressure reaches the cut-out point of unloading valve 18. Thereupon the valve 18 unloads pump 14 and pump 36 continues in operation additionally charging the accumulators until its own regulator begins to reduce its displacement.

When the booster system 46 and 48 is in operation its fluid requirements are amply met by the pump 36 and its self-contained regulator adjusts its displacement so that it delivers only the quantity of oil consumed by the booster system plus any leakage make-up requirements. Thus, when the large-volume devices are not being operated, pump 14 may remain unloaded continuously and pump 36 automatically takes over the supply of fluid to the booster system.

It will be noted that, in the even of failure of either pump, that the system may continue in operation. For example, in the event of failure of pump 36, the pressure in the main line 26 is prevented from escaping through pump 36 by the check valve 40 and pump 14, unloading valve 18 and accumulator 32 maintain pressure in line 26 in conventional fashion, which can be used to operate the low-volume part of the system in such emergencies. Likewise, in the event of failure of pump 14 or unloading valve 18, the check valve therein prevents loss of pressure from the main line 26 and pump 36 will continue supplying oil to the system. Under these conditions, of course, the fluid motors 44 will operate much more slowly, but no less positively, so that the pump 36 provides a stand-by which is usable in such emergency.

While the form of embodiment of the invention as herein disclosed constitutes a preferred form, it is to be understood that other forms might be adopted, all coming within the scope of the claims which follow.

What is claimed is as follows:

1. A pressure source for a hydraulic power system of the type having a substantially continuous demand at low volume and an intermittent demand at large volume comprising in combination, a fixed displacement pump, unloading valve and accumulator of sufficient capacity to supply substantially the entire large volume demand, and a pressure-controlled, variable displacement pump of a capacity at least equivalent to the low volume demand and connected in parallel with the first pump, the unloading valve being adjusted to unload the first pump at a pressure lower than the pressure at which the second pump begins to operate at reduced displacement whereby the continuous demand may be supplied by the second pump and the first pump may remain unloaded except during periods of large volume demand.

2. A pressure source for a hydraulic power system of the type having a substantially continuous demand at low volume and an intermittent demand at large volume comprising in combination, a fixed displacement pump, unloading valve and accumulator of sufficient capacity to supply substantially the entire large volume demand, a pressure-controlled, variable displacement pump of a capacity at least equivalent to the low volume demand and connected in parallel with the first pump, the unloading valve being adjusted to unload the first pump at a pressure lower than the pressure at which the second pump begins to operate at reduced displacement whereby the continuous demand may be supplied by the second pump and the first pump may remain unloaded except during periods of large volume demand, and a check valve in the outlet of the second pump whereby in the event of failure of either pump the other pump may remain operative to supply the entire system.

FERRIS T. HARRINGTON.

REFERENCES CITED

The following references are of record in the file of this patent:

UNITED STATES PATENTS

| Number | Name | Date |
|---|---|---|
| 410,456 | Shuls | Sept. 3, 1889 |
| 1,885,565 | Terry | Nov. 1, 1932 |
| 1,970,380 | Hosel | Aug. 14, 1934 |
| 2,431,071 | Norman | Nov. 18, 1947 |

FOREIGN PATENTS

| Number | Country | Date |
|---|---|---|
| 703,569 | France | 1931 |